(12) United States Patent
Nam (10) Patent No.: US 8,265,704 B2
(45) Date of Patent: Sep. 11, 2012

(54) CHARACTER INPUT METHOD OF MOBILE TERMINAL

(75) Inventor: Seung-Woo Nam, Seongnam (KR)

(73) Assignee: LG Electronics Inc., Seoul (KR)

( * ) Notice: Subject to any disclaimer, the term of this patent is extended or adjusted under 35 U.S.C. 154(b) by 358 days.

(21) Appl. No.: 12/435,029

(22) Filed: May 4, 2009

(65) Prior Publication Data

US 2010/0004030 A1    Jan. 7, 2010

(30) Foreign Application Priority Data

Jul. 1, 2008    (KR) .................. 10-2008-0063611

(51) Int. Cl.
*H04B 1/38* (2006.01)
(52) U.S. Cl. .................. 455/566; 345/157; 345/173
(58) Field of Classification Search .............. 715/700, 715/708, 773, 256, 269, 754, 856, 860; 345/173, 345/467, 156, 157, 168, 171, 172, 160; 455/566
See application file for complete search history.

(56) References Cited

U.S. PATENT DOCUMENTS

| 7,487,461 | B2 * | 2/2009 | Zhai et al. | 715/773 |
| 7,973,764 | B2 * | 7/2011 | Kim | 345/157 |
| 2006/0026521 | A1 * | 2/2006 | Hotelling et al. | 715/702 |
| 2006/0209073 | A1 * | 9/2006 | Nako | 345/467 |

* cited by examiner

*Primary Examiner* — George Eng
*Assistant Examiner* — Hung Du
(74) *Attorney, Agent, or Firm* — Birch, Stewart, Kolasch & Brich, LLP (57) ABSTRACT

A mobile terminal includes a display screen to display a screen image of a particular character and a virtual keypad, and to detect touch inputs; and a controller to detect a first touch input of touching the particular character and a second touch input of touching a particular key of the virtual keypad, and to control display of display characters on respective key buttons of the virtual keypad, the display characters having at least one attribute of the particular character, if the first and second inputs are a multi-touch. Because a font of particular character is applied to the display character of the virtual keypad or to a newly input character, characters or numbers can be easily input using the display screen of the mobile terminal.

10 Claims, 10 Drawing Sheets

(a) ONE-POINT(THE WHOLE)-TOUCH (b) MULTI-TOUCH

CHARACTER INPUT METHOD OF MOBILE TERMINAL

CROSS REFERENCE TO RELATED APPLICATIONS

The present application claims priority to Korean Application No. 10-2008-0063611 filed in Korea on Jul. 1, 2008, the entire contents of which is hereby incorporated by reference in its entirety.

BACKGROUND OF THE INVENTION

1. Field of the Invention

The present invention relates to a mobile terminal and, more particularly, to displaying of menus of a mobile terminal.

2. Description of the Related Art

A mobile terminal is a portable device having one or more functions of voice and video communications, inputting/outputting information, storing data, or the like.

As mobile terminals have various functions besides communication, such as capturing images and video via a camera, playing music files or video, supports playing of games, receiving broadcasts, or the like, mobile terminals are implemented in the form of comprehensive multimedia players.

Efforts are ongoing to support and increase the complicated functions of the multimedia players. Such efforts include a touch screen and a user interface (UI) allowing a user to easily and conveniently manipulate and select menus related to the completed functions.

SUMMARY OF THE INVENTION

Accordingly, one object of the present invention is to address the above-noted and other problems.

Another object of the present invention is to provide a mobile terminal in which a font setting of an input character is applied to a keypad by using a multi-point touch.

Still another object of the present invention is to provide a mobile terminal in which a font setting of a previously input character is applied to a newly input character by using a multi-point touch.

To achieve these and other advantages and in accordance with the purpose of the present invention, as embodied and broadly described herein, the present invention provides in one aspect a mobile terminal including: a display screen configured to display a screen image of a particular character and a virtual keypad, and to detect touch inputs; and a controller configured to detect a first touch input of touching the particular character and a second touch input of touching a particular key of the virtual keypad, and to control display of display characters on respective key buttons of the virtual keypad, the display characters having at least one attribute of the particular character, if the first and second inputs are a multi-touch.

To achieve these and other advantages and in accordance with the purpose of the present invention, as embodied and broadly described herein, the present invention provides in another aspect a character input method of a mobile terminal, including: detecting a first touch input of touching a screen image of a particular character displayed on a display screen of the mobile terminal; detecting a second touch input of touching a screen image of a particular key of a virtual keypad displayed on the display screen of the mobile terminal; and displaying display characters on respective key buttons of the virtual keypad, the display characters having at least one attribute of the particular character, if the first and second touches are a multi-touch.

To achieve these and other advantages and in accordance with the purpose of the present invention, as embodied and broadly described herein, the present invention provides in still another aspect a mobile terminal, including: a display screen configured to display a screen image of a particular character and a virtual keypad and to detect touch inputs; and a controller configured to detect a first touch input of touching the particular character and a second touch input of touching a particular key of the virtual keypad, and to control display of a display character of the particular key corresponding to the second touch input according to an attribute of the particular character, if the first and second touch inputs are a multi-touch.

To achieve these and other advantages and in accordance with the purpose of the present invention, as embodied and broadly described herein, the present invention provides in yet another aspect a character input method of a mobile terminal, including: detecting a first touch input of touching a screen image of a particular character displayed on a display screen of the mobile terminal; detecting a second touch input of touching a screen image of a particular key of a virtual keypad displayed on the display screen of the mobile terminal; and displaying a display character of the particular key corresponding to the second touch input according to an attribute of the particular character, if the first and second touch inputs are a multi-touch.

Further scope of applicability of the present invention will become apparent from the detailed description given hereinafter. However, it should be understood that the detailed description and specific examples, while indicating example embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE INVENTION

The mobile terminal according to example embodiments of the present invention will now be described with reference to the accompanying drawings. In the following description, usage of suffixes such as 'module', 'part' or 'unit' used for referring to elements is given to facilitate explanation of the present invention, without limiting the meaning by itself.

Figure 1:
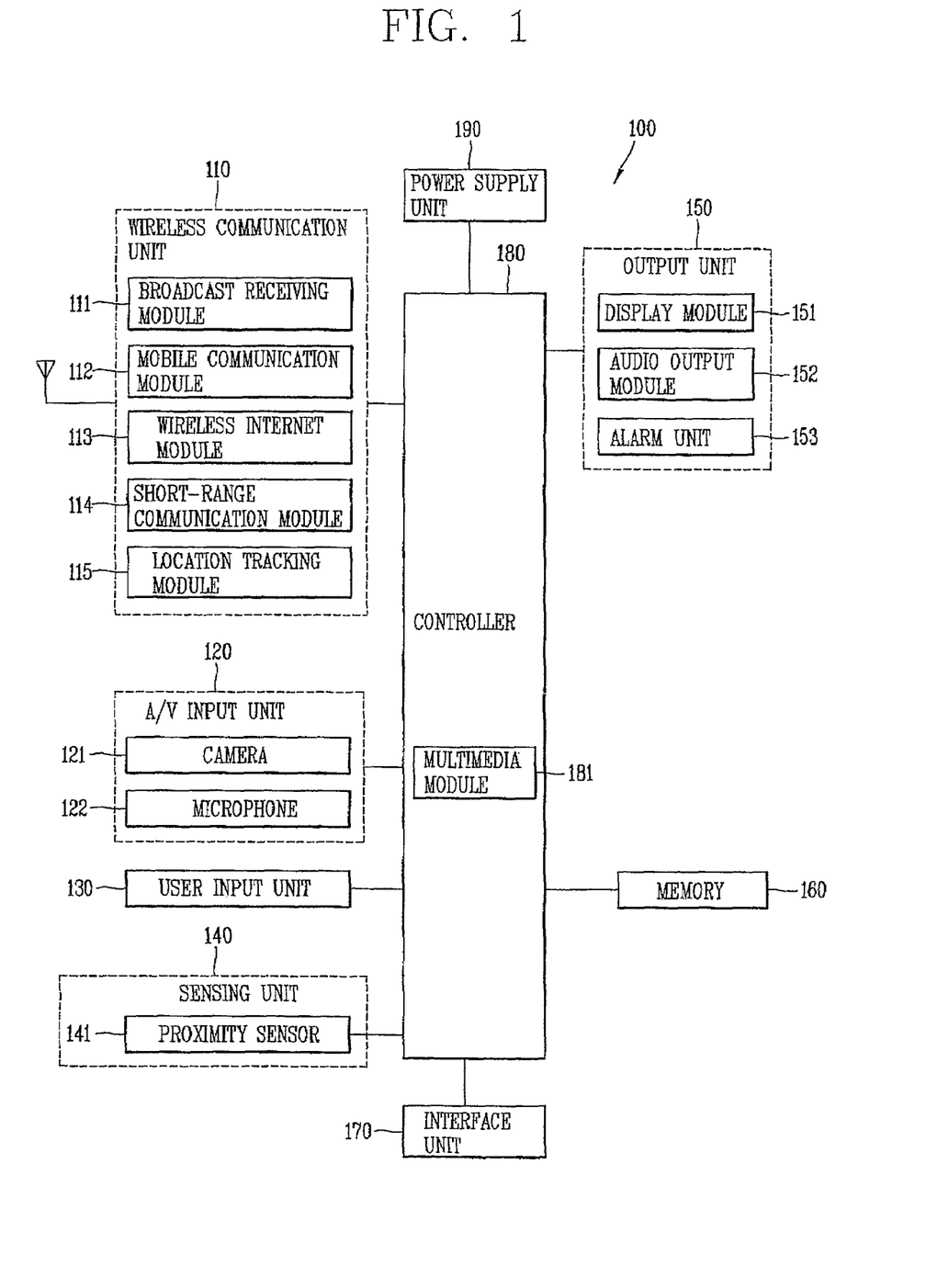
FIG. 1 is a schematic block diagram of a mobile terminal implementing an embodiment of the present invention.

FIG. 1 is a schematic block diagram of a mobile terminal implementing an embodiment of the present invention.

The mobile terminal described in the present invention may include mobile phones, smart phones, notebook computers, digital broadcast receivers, PDAs (Personal Digital Assistants), PMPs (Portable Multimedia Player), navigation devices, and the like. It would be understood by a person in the art that the configuration according to the embodiments of the present invention can be also applicable to the fixed types of terminals such as digital TVs, desk top computers, or the like, in addition to elements especially configured for a mobile purpose.

FIG. 1 is a block diagram of a mobile terminal according to an embodiment of the present invention.

The mobile terminal 100 according to an embodiment of the present invention will now be described with reference to FIG. 1.

The mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190, etc.

FIG. 1 shows the mobile terminal 100 as having various components, but it should be understood that implementing all of the illustrated components is not a requirement. Greater or fewer components may alternatively be implemented.

The elements of the mobile terminal 100 will be described in detail as follows.

The wireless communication unit 110 typically includes one or more components allowing radio communication between the mobile terminal 100 and a wireless communication system or a network in which the mobile terminal 100 is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information, or a server that receives a previously generated broadcast signal and/or broadcast associated information and transmits the same to a terminal, such as the mobile terminal 100. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), a data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160 (or another type of storage medium).

The mobile communication module 112 transmits and/or receives radio signals to and/or from at least one of a base station (e.g., access point, Node B, etc.), an external terminal (e.g., other user devices) and a server (or other network entities). Such radio signals may include a voice call signal, a video call signal or various types of data according to text and/or multimedia message transmission and/or reception techniques.

The wireless Internet module 113 supports wireless Internet access for the mobile terminal 100. This module may be internally or externally coupled to the mobile terminal 100. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 is a module for supporting short range communications. Some examples of short-range communication technology includes Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile terminal 100. For example, the location information module 115 may be embodied by using a GPS (Global Positioning System) module that receives location information from a plurality of satellites. Here, the location information may include coordinate information represented by latitude and longitude values. For example, the GPS module may measure an accurate time and distance from three or more satellites, and accurately calculate a current location of the mobile terminal 100 according to trigonometry (or triangulation) based on the measured time and distances. A method of acquiring distance and time information from three satellites and performing error correction with a single satellite may be used. In particular, the GPS module may acquire an accurate time together with three-dimensional speed information, as well as the location of the latitude, longitude and altitude values from the location information received from the satellites.

The A/V input unit 120 is configured to receive an audio or video signal. The A/V input unit 120 may include a camera 121 (or other image capture device) and a microphone 122 (or other sound pick-up device). The camera 121 processes image data of still pictures or video obtained by an image capture device in a video capturing mode or an image capturing mode. The processed image frames may be displayed on a display module 151 (or other visual output device).

The image frames processed by the camera 121 may be stored in the memory 160 (or other storage medium) or transmitted via the wireless communication unit 110. Two or more cameras 121 may be provided according to the configuration of the mobile terminal 100.

The microphone 122 may receive sounds (audible data) via a microphone (or the like) in a phone call mode, a recording mode, a voice recognition mode, and the like, and can process such sounds into audio data. The processed audio (voice) data may be converted for output into a format transmittable to a mobile communication base station (or other network entity) via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 (or other user input device) may generate key input data from commands entered by a user to control various operations of the mobile terminal 100. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like. In particular, when the touch pad is overlaid on the display module 151 in a layered manner, it may form a touch screen.

The sensing unit 140 (or other detection means) detects a current status (or state) of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. The sensing unit 140 may include a proximity sensor 141, which will be described in association with the touch screen.

The interface unit 170 (or other connection means) serves as an interface by which at least one external device may be connected with the mobile terminal 100. For example, the external devices may include wired or wireless headset ports, an external power supply (or battery charger) ports, wired or wireless data ports, memory card ports, ports for connecting a device having an identification module, audio input/output (I/O) ports, video I/O ports, earphone ports, or the like.

The identification module may be a memory chip (or other element with memory or storage capabilities) that stores various information for authenticating user's authority for using the mobile terminal 100, and may include a user identity module (UIM), a subscriber identity module (SIM), a universal subscriber identity module (USIM), and the like. In addition, the device having the identification module (referred to as the 'identifying device', hereinafter) may take the form of a smart card. Accordingly, the identifying device may be connected with the terminal 100 via a port or other connection means.

The interface unit 170 may be used to receive inputs (e.g., data, information, power, etc.) from an external device and transfer the received inputs to one or more elements within the mobile terminal 100 or may be used to transfer data between the mobile terminal 100 and an external device.

In addition, when the mobile terminal 100 is connected with an external cradle, the interface unit 170 may serve as a conduit to allow power from the cradle to be supplied therethrough to the mobile terminal 100, or may serve as a conduit to allow various command signals input from the cradle to be transferred to the mobile terminal 100 therethrough. Various command signals or power input from the cradle may operate as signals for recognizing when the mobile terminal 100 is properly mounted on the cradle.

The output unit 150 is configured to provide outputs in a visual, audible, and/or tactile manner (e.g., audio signal, video signal, alarm signal, vibration signal, etc.). The output unit 150 may include the display module 151, an audio output module 152, an alarm unit 153, and the like.

The display module 151 may display information processed in the mobile terminal 100. For example, when the mobile terminal 100 is in a phone call mode, the display module 151 may display a User Interface (UI) or a Graphic User Interface (GUI) associated with a call or other communication (such as text messaging, multimedia file downloading, etc.). When the mobile terminal 100 is in a video call mode or image capturing mode, the display module 151 may display a captured image and/or received image, a UI or GUI that shows videos or images and functions related thereto, and the like.

Meanwhile, when the display module 151 and the touch pad are overlaid in a layered manner to form a touch screen, the display module 151 may function as both an input device and an output device. The display module 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like. Some of them may be configured to be transparent to allow viewing of an exterior thereof, which may be called transparent displays. A typical transparent display may be, for example, a TOLED (Transparent Organic Light Emitting Diode) display, or the like. The mobile terminal 100 may include two or more display units (or other display means) according to its particular desired embodiment. For example, the mobile terminal 100 may include both an external display unit and an internal display unit.

The touch screen may be configured to detect a touch input pressure as well as a touch input position and a touch input area.

A proximity sensor 141 may be disposed within or near the touch screen. The proximity sensor 141 is a sensor for detecting the presence or absence of an object relative to a certain detection surface or an object that exists nearby by using the force of electromagnetism or infrared rays without a physical contact. Thus, the proximity sensor 141 has a considerably longer life span compared with a contact type sensor, and it can be utilized for various purposes.

Examples of the proximity sensor 141 may include a transmission type photo sensor, a direct reflection type photo sensor, a mirror-reflection type photo sensor, an RF oscillation type proximity sensor, a capacitance type proximity sensor, a magnetic proximity sensor, an infrared proximity sensor, and the like.

The operational principle of the RF oscillation type proximity sensor, among the implementable proximity sensors, will be described as an example. When an object approaches the sensor detection surface in a state that an RF (Radio Frequency) of a static wave is oscillated by an oscillation circuit, the oscillation amplitude of the oscillation circuit is attenuated or stopped, and such a change is converted into an electrical signal to detect the presence or absence of an object. Thus, even if any material other than a metallic one is positioned between the RF oscillation proximity sensor and the object, a proximity switch can detect the object intended to be detected without interference from the object.

Without the proximity sensor 141, if the touch screen is an electrostatic type, the approach of a pointer (stylus) can be detected based on a change in a field according to the approach of the pointer.

Thus, although the pointer is not actually brought into contact with the touch screen but merely positioned close to the touch screen, the position of the pointer and the distance between the pointer and the touch screen can be detected. In the following description, for the sake of brevity, recognition of the pointer positioned to be close to the touch screen will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

By employing the proximity sensor 141, a proximity touch and a proximity touch pattern (e.g., a proximity touch distance, a proximity touch speed, a proximity touch time, a proximity touch position, a proximity touch movement state, or the like) can be detected, and information corresponding to a detected proximity touch operation and the proximity touch pattern can be outputted to the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, or other sound generating device.

The alarm unit 153 (or other type of user notification device or means) may provide outputs to inform about the occurrence of an event of the mobile terminal 100. Typical events may include call reception, message reception, key signal inputs, a touch input etc. In addition to audio or video outputs, the alarm unit 153 may provide outputs in a different manner to inform about the occurrence of an event. For example, the alarm unit 153 may provide an output in the form of vibrations (or other tactile or sensible outputs). When a call, a message, or some other incoming communication is received, the alarm unit 153 may provide tactile outputs (i.e., vibrations) to inform the user thereof. By providing such tactile outputs, the user can recognize the occurrence of various events even if his mobile phone is not in the user's hand, such as when his mobile phone in the user's pocket. Such outputs informing about the occurrence of an event may be also provided via the display module 151 or the audio output module 152.

The memory 160 (or other storage means) may store software programs or the like used for the processing and controlling operations performed by the controller 180, or may temporarily store data (e.g., a phonebook, messages, still images, video, etc.) that have been outputted or which are to be outputted. In addition, the memory 160 may store data regarding various patterns of vibrations and audio signals to be outputted when a touch is applied to the touch screen.

The memory 160 may include at least one type of storage medium including a Flash memory, a hard disk, a multimedia card, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, an optical disk, and the like. Also, the mobile terminal 100 may cooperate with a network storage device that performs the storage function of the memory 160 over a network connection.

The controller 180 (such as a microprocessor or the like) typically controls the general operations of the mobile terminal 100. For example, the controller 180 performs controlling and processing associated with voice calls, data communications, video calls, and the like. In addition, the controller 180 may include a multimedia module 181 for reproducing (or playing back) multimedia data. The multimedia module 181 may be configured within the controller 180 or may be configured to be separate from the controller 180.

The controller 180 may perform a pattern recognition processing to recognize a handwriting input or a picture drawing input performed on the touch screen as characters or images.

The power supply unit 190 receives external power (via a power cable connection) or internal power (via a battery of the mobile terminal 100) and supplies appropriate power required for operating respective elements and components under the control of the controller 180.

Various embodiments as described herein may be implemented in a computer-readable medium using, for example, computer software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented in the controller 180.

For software implementation, the embodiments such as procedures or functions may be implemented together with separate software modules that allow performing of at least one function or operation. Software codes can be implemented by a software application (or program) written in any suitable programming language. The software codes may be stored in the memory 160 and executed by the controller 180.

So far, the mobile terminal 100 itself has been described from the perspective of its functions. Hereinafter, external elements of the mobile terminal 100 will be described from the perspective of their functions with reference to FIGS. 2 and 3.

The mobile terminal 100 may be implemented in a variety of different configurations. Examples of such configurations include folder-type, bar-type, swing-type, a slide type, as well as various other configurations. The following description will primarily relate to a slide-type mobile terminal. However, such description can equally apply to other types of mobile terminals.

Figure 2:
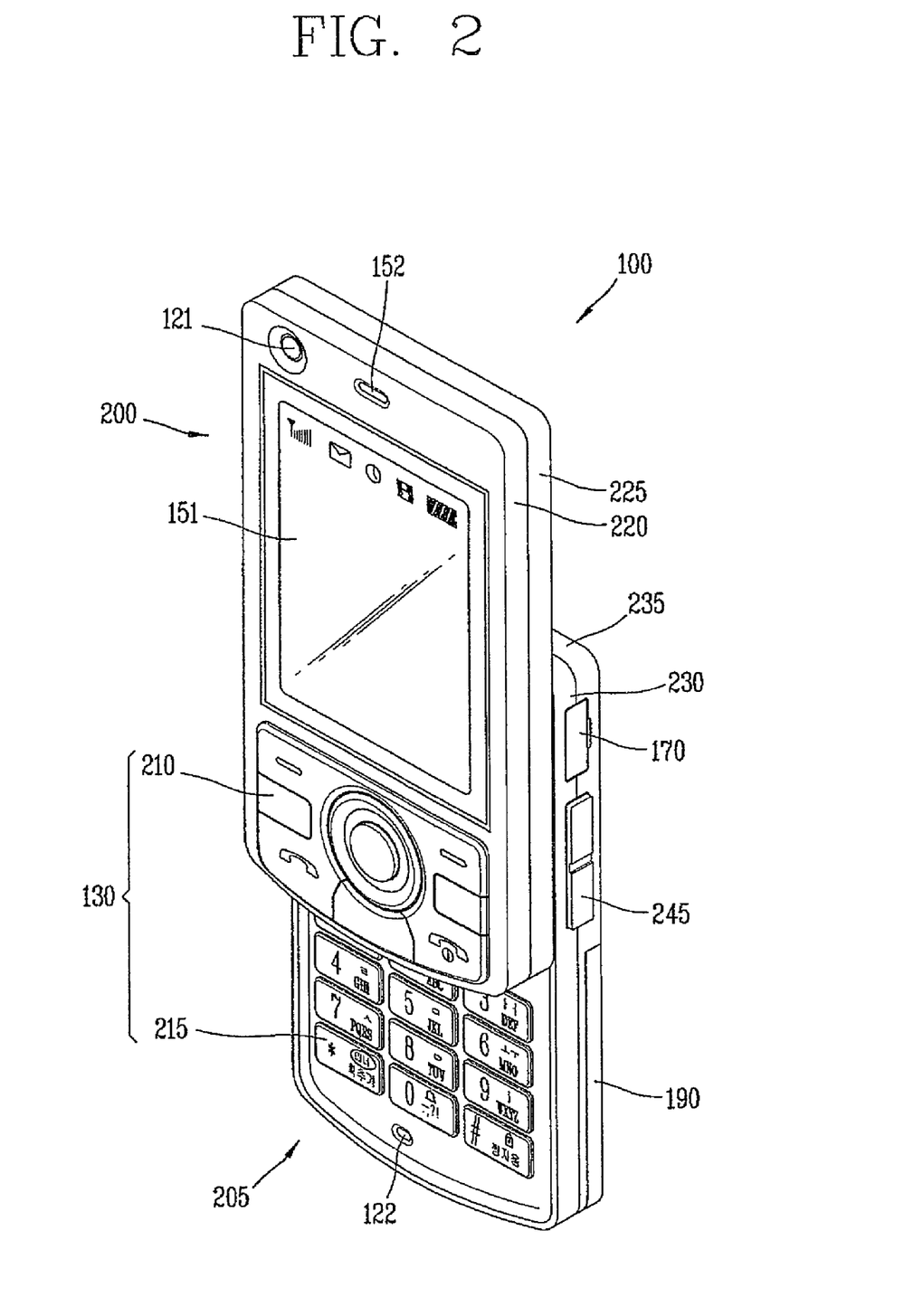
FIG. 2 is a front perspective view of a mobile terminal implementing an embodiment of the present invention.

FIG. 2 is a front perspective view of the mobile terminal according to an embodiment of the present invention.

The mobile terminal 100 according to the present invention includes a first body 200, and a second body 205 that can be slidably moved along at least one direction with respect to the first body 200. In case of a folder type mobile phone, the mobile terminal may include a first body, and a second body having one side that can be folded or unfolded with respect to the first body.

A state in which the first body 200 is disposed to overlap with the second body 205 may be called a closed configuration, and as shown in FIG. 2, a state in which at least a portion of the second body 205 is exposed may be called an open configuration.

Although not shown, the mobile terminal 100 according to the present invention may be the folder type mobile terminal including the first body, and the second body having one side to be folded or unfolded with respect to the first body. Here, a state in which the second body is folded may be called a closed configuration, and a state in which the second body is unfolded may be called an open configuration.

In addition, although not shown, the mobile terminal according to the present invention may be a swing type mobile terminal including a first body, and a second body configured to be swingable with respect to the first body. Here, a state in which the first body is disposed to overlap with the second body may be called a closed configuration, and a state in which the second body is swung to expose a portion of the first body may be called an open configuration.

The folder type mobile terminal and the swing type mobile terminal, as well as their operations, is easily understood by the person skilled in the art without further explanation, so their detailed descriptions will be omitted.

In the closed configuration, the mobile terminal 100 mainly operates in a standby (or idle) mode, and the standby mode may be released upon user manipulation. The mobile terminal 100 operates mainly in the calling mode or the like in the open configuration, and it can be changed to the standby mode with the lapse of time or upon user manipulation.

The case (or casing, housing, cover, etc.) constituting the external appearance of the first body 200 may include a first front case 220 and a first rear case 225. Various electronic components are installed in a space between the first front case 220 and the first rear case 225. One or more intermediate cases may be additionally disposed between the first front case 220 and the first rear case 225.

The cases may be formed by injection-molding a synthetic resin or may be made of a metallic material such as stainless steel (STS) or titanium (Ti), etc.

The display module 151, the audio output module 152, the camera 121 or the first user input unit 210 may be located at the first body, 200, specifically, on the first front case 220 of the first body 200.

The display module 151 may include an LCD (Liquid Crystal Display), an OLED (Organic Light Emitting Diode), and the like, that visually displays information.

A touch pad may be overlaid in a layered manner on the display module 151 to allow the display module 151 to function as a touch screen to input information via user gestures or touch inputs.

The audio output unit 152 may be implemented in the form of a speaker or other sound producing device.

The camera 121 may be implemented to be suitable for capturing images or video with respect to the user and other objects.

Like the first body 200, the case constituting the external appearance of the second body 205 may include a second front case 230 and a second rear case 235.

A second user input unit 215 may be disposed at the second body 205, specifically, at a front face of the second body 205.

A third user input unit 245, the microphone 122, and the interface unit 170 may be disposed on at least one of the second front case 230 and the second rear case 235.

The first to third user input units 210, 215 and 245 may be generally referred to as the user input unit 130, and various methods and techniques can be employed for the manipulation unit so long as they can be operated by the user in a tactile manner.

For example, the user input unit 130 can be implemented as dome switches, actuators, or touch pad regions that can receive user commands or information according to the user's touch operations (e.g., pressing, pushing, swiping, drag-and-drop, etc.) or may be implemented in the form of a rotatable control wheel (or disc), keys or buttons, a jog dial, a joystick, or the like.

In terms of their functions, the first user input unit 210 is used for inputting (entering) commands such as start, end, scroll or the like, and the second user input unit 215 is used for inputting (entering) numbers, characters, symbols, or the like. The first user input unit 210 may include a soft key used by interworking with icons displayed on the display unit 151 and navigation key (largely including four direction keys and a central key) for indicating and checking directions.

Also, the third user input unit 245 may support the so-called hot key functions that allow more convenient activation of particular functions for the mobile terminal 100.

The microphone 122 (or other sound pick-up device) may be appropriately implemented to detect user voice inputs, other sounds, and the like.

The interface unit 170 may be used as a communication link (or passage, path, etc.) through which the terminal can exchange data or the like with an external device. For example, the interface unit 170 may be implemented in the form of a connection port for connecting an earphone to the mobile terminal 100 via a fixed or wireless means, a port for short-range communications (e.g., an Infrared Data Association (IrDA) port, a Bluetooth™ port, a wireless LAN port, etc.), power supply ports for providing power to the mobile terminal 100, or the like.

Also, the interface unit 170 may be a card socket for accommodating a SIM (Subscriber Identification Module) card or a UIM (User Identity Module) card, or an external card such as a memory card for storing information.

The power supply unit 190 for supplying power to the terminal may be located at the second rear case 235.

The power supply unit 190 may be, for example, a rechargeable battery that can be detached.

Figure 3:
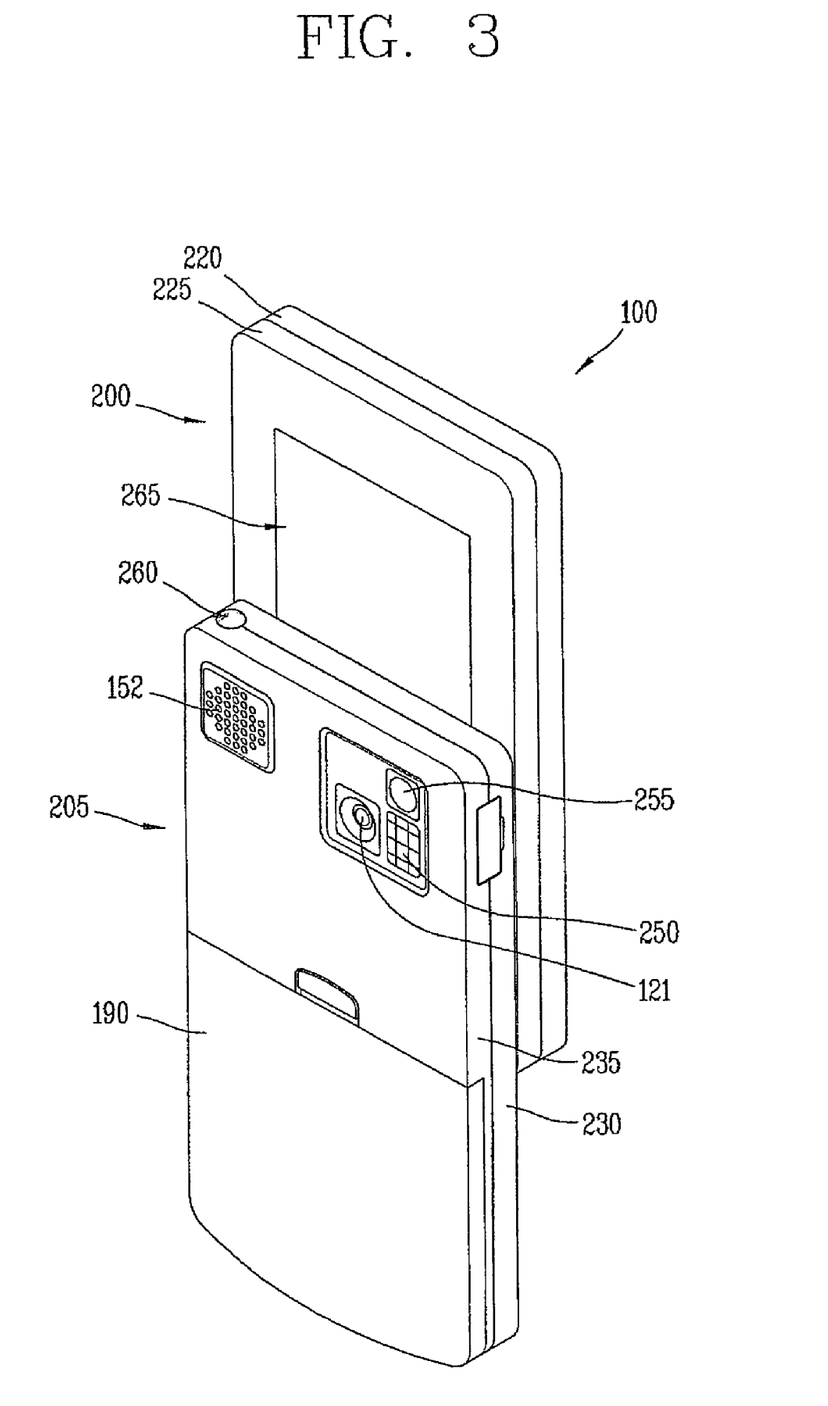
FIG. 3 is a rear perspective view of a mobile terminal implementing an embodiment of the present invention.

FIG. 3 is a rear perspective view of the mobile terminal of FIG. 2 according to an example embodiment.

As shown in FIG. 3, a camera 121 (or other image pick-up device) may additionally be disposed on a rear surface of the second rear case 235 of the second body 205. The camera 121 of the second body 205 may have an image capture direction which is substantially opposite to that of the camera 121 of the first body 200 (namely, the two cameras may be implemented to face towards opposing directions, such as front and rear), and may support a different number of pixels (i.e., have a different resolution) than the camera 121 of the first body 200.

For example, the camera 121 of the first body 200 may operate with a relatively lower resolution to capture an image (s) of the user's face and immediately transmit such image(s) to another party in real-time during video call communication or the like in which reverse link bandwidth capabilities may be limited. Also, the camera 121 of the second body 205 may operate with a relatively higher resolution to capture images of general objects with high picture quality, which may not require immediately transmission in real-time, but may be stored for later viewing or use.

Additional camera related components, such as a flash 250 and a mirror 255, may be additionally disposed adjacent to the camera 121. When an image of the subject is captured with the camera 121 of the second body 205, the flash 250 illuminates the subject. The mirror 255 allows the user to see himself when he wants to capture his own image (i.e., self-image capturing) by using the camera 121 of the second body 205.

The second rear case 235 may further include an audio output module 152. The audio output module 152 of the second body 205 may support stereophonic sound functions in conjunction with the audio output module 152 of the first body 200 and may be also used for sending and receiving calls in a speaker phone mode.

A broadcast signal receiving antenna 260 may be disposed (externally or internally) at one side or region of the second rear case 235, in addition to an antenna that is used for mobile communications. The antenna 260 can also be configured to be retractable from the second body 205.

One part of a slide module 265 that allows the first body 200 and the second body 205 to slide relative to each other may be disposed on the first rear case 225 of the first body 200.

The other part of the slide module 265 may be disposed on the second front case 230 of the second body 205, which may not be exposed in FIG. 3.

The second camera 121 and other components may be disposed on the second body 205, but such a configuration is not meant to be limited.

For example, one or more of the elements (e.g., 260, 121 and 250 and 152 etc.), which are disposed on the second rear case 235 may be mounted on the first body 200, mainly, on the first rear case 225. In this case, those elements disposed on the first rear case 225 can be protected (or covered) by the second body 205 in the closed configuration. In addition, even if a separate camera is not provided at the second body 205, the camera module 121 may be configured to rotate (or otherwise be moved) to thus allow image capturing in various directions.

The mobile terminal 100 as shown in FIGS. 1 to 3 may be configured to operate with a communication system, which transmits data via frames or packets, such as wired and wireless communication systems, as well as satellite-based communication systems.

Such communication systems in which the mobile terminal 100 according to the present invention can operate will now be described with reference to FIG. 4.

Such communication systems may use different air interfaces and/or physical layers. For example, air interfaces utilized by the communication systems include example, frequency division multiple access (FDMA), time division multiple access (TDMA), code division multiple access (CDMA), and universal mobile telecommunications system (UMTS) (in particular, long term evolution (LTE)), global system for mobile communications (GSM), and the like. As a non-limiting example, the description hereafter relates to a CDMA communication system, but such teachings apply equally to other types of systems.

Figure 4:
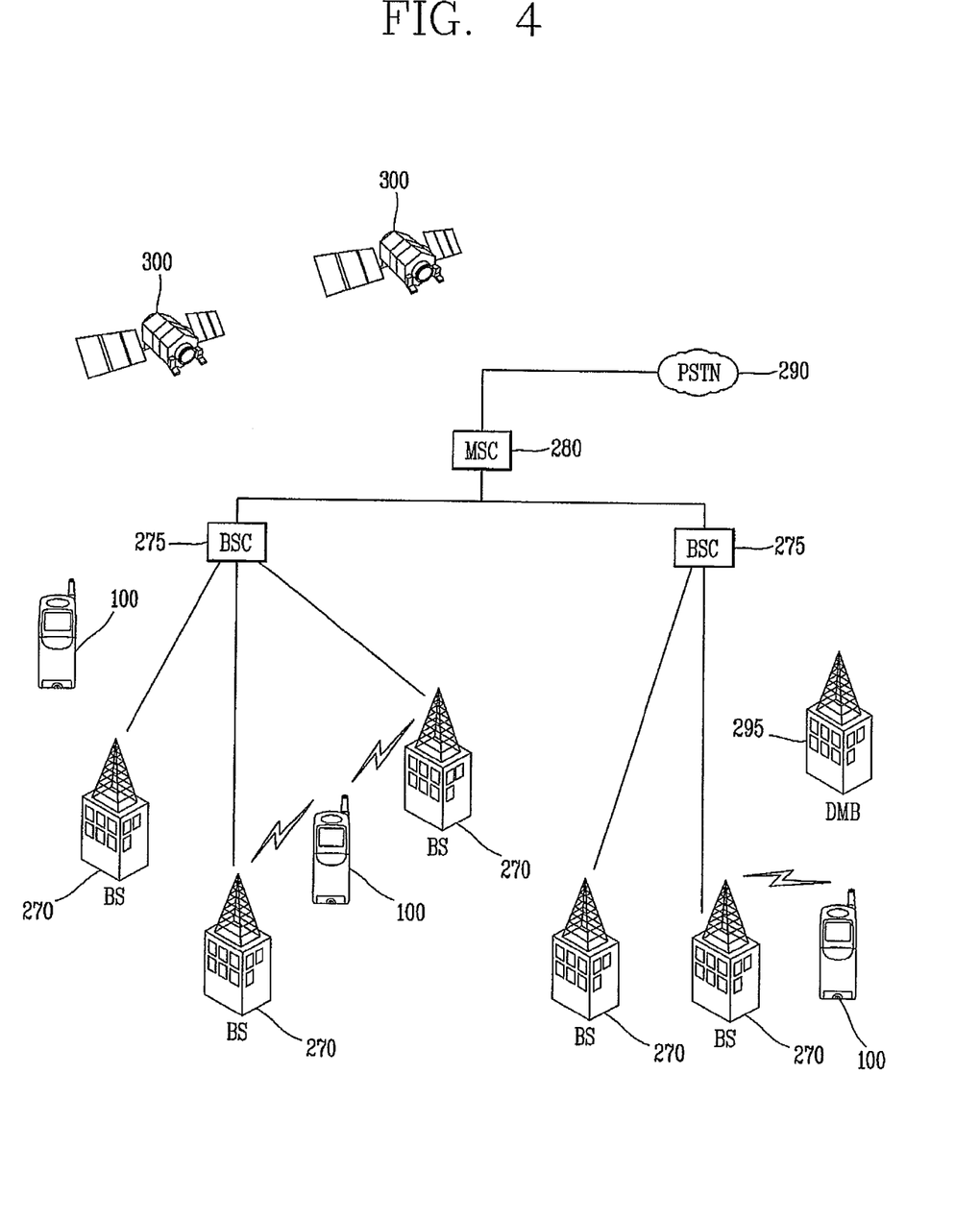
FIG. 4 is a block diagram of a wireless communication system within which the mobile terminal according to an embodiment of the present invention is operable.

Referring to FIG. 4, a CDMA wireless communication system may include a plurality of mobile terminals 100, a plurality of base stations (BSs) 270, base station controllers (BSCs) 275, and a mobile switching center (MSC) 280. The MSC 280 is configured to interface with a public switch telephone network (PSTN) 290. The MSC 280 is also configured to interface with the BSCs 275, which may be coupled to the base stations 270 via backhaul lines. The backhaul lines may be configured in accordance with any of several known interfaces including, for example, E1/T1, ATM, IP, PPP, Frame Relay, HDSL, ADSL, or xDSL. It is to be understood that the system as shown in FIG. 4 may include a plurality of BSCs 275.

Each BS 270 may serve one or more sectors (or regions), each sector covered by an omni-directional antenna or an antenna pointed in a particular direction radially away from the BS 270. Alternatively, each sector may be covered by two or more antennas for diversity of reception. Each BS 270 may be configured to support a plurality of frequency assignments, and each frequency assignment has a particular spectrum (e.g., 1.25 MHz, 5 MHz, etc).

The intersection of a sector and frequency assignment may be referred to as a CDMA channel. The BS 270 may also be referred to as base station transceiver subsystems (BTSs) or other equivalent terms. In such case, the term "base station" may be used to collectively refer to a single BSC 275 and at least one BS 270. The base station may also be referred to as a "cell site". Alternatively, individual sectors of a particular BS 270 may be referred to as a plurality of cell sites.

As shown in FIG. 4, a broadcasting transmitter (BT) 295 transmits a broadcast signal to the mobile terminals 100 operating within the system. The broadcast receiving module 111 as shown in FIG. 1 is provided at the terminal 100 to receive broadcast signals transmitted by the BT 295.

In FIG. 4, several global positioning systems (GPS) satellites 300 are shown. The satellites 300 help locate at least one of a plurality of terminals 100.

In FIG. 4, two satellites 300 are depicted, but it is understood that useful positioning information may be obtained with any number of satellites. The GPS module 115 as shown in FIG. 1 is typically configured to cooperate with the satellites 300 to obtain desired positioning information.

Instead of or in addition to GPS tracking techniques, other technologies that may track the location of the mobile terminals 100 may be used. In addition, at least one of the GPS satellites 300 may selectively or additionally handle satellite DMB transmissions.

As one typical operation of the wireless communication system, the BSs 270 receive reverse-link signals from various mobile terminals 100. The mobile terminals 100 typically engage in calling, messaging, and other types of communications. Each reverse-link signal received by a particular base station 270 is processed within the particular BS 270.

The resulting data is forwarded to an associated BSC 275. The BSC 275 provides call resource allocation and mobility management functionality including the coordination of soft handoff procedures between BSs 270. The BSCs 275 also route the received data to the MSC 280, which provides additional routing services for interfacing with the PSTN 290. Similarly, the PSTN 290 interfaces with the MSC 280, the MSC interfaces with the BSCs 275, and the BSCs 275 in turn control the BSs 270 to transmit forward-link signals to the mobile terminals 100.

The example embodiments of the present invention will now be described with reference to the accompanying drawings.

Figure 5:
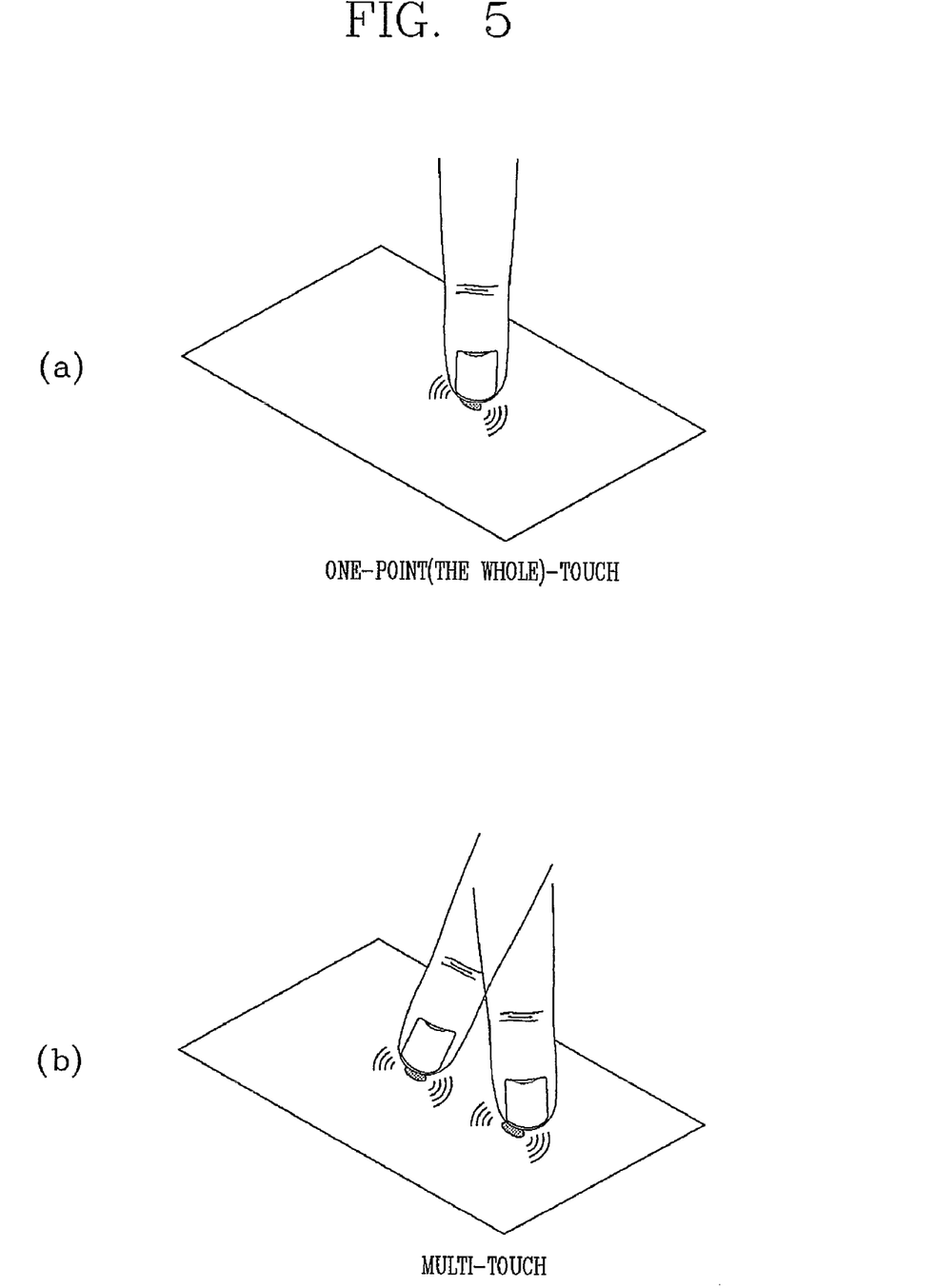
FIG. 5 shows an example of discriminating a one-point touch and a multi-touch.

The present invention is devised to implement a mobile terminal in which a font of an input character is applied to a display character of a keypad or to a newly input character by using a multi-point touch. The multi-touch is a technique for recognizing all the touch contacts simultaneously applied to multiple points on a touch screen (or while two or more contacts are being applied to respective two or more points). When a second touch is input while a first touch is maintained on the touch screen, the controller 180 regards the first and second touches as a multi-touch. This is different from a general case, where while one touch is maintained, another touch is not allowed to be input. For example, in the general case, if a character 'a' is input, while the touch is maintained at the key button 'a', a character input is not generated. The moment the user puts off his hand (or stylus, etc.) from the key button 'a', the character 'a' is input. In aspects of the present invention, however, FIG. 5 shows an example of discriminating a one-point touch and a multi-touch. With reference to FIG. 5, when a touch is input via the touch screen, the controller 180 checks whether the touch input is detected from only one point, or from two (or more) points. The controller 180 regards a one-point touch and a multi-touch as completely different inputs in processing them. In embodiments of the present invention, the multi-touch may be one in which two or more points are touched simultaneously. For example, the multi-touch includes having a first point be touched, and soon after a second point be touched, so that there is a period of time when both the first and second points are respectively touched. In other words, start and end time of the first and second touches need not be the same. Rather, a period of time when the first point is touched, and a period of time when the second point is touched simply needs to overlap.

The character input method according to the first embodiment of the present invention is one where a font of an input character is applied to a display character of a keypad by using a multi-touch. In the present invention, the font is defined as character attributes including a size, color, or the like, as well as a type (shape) of a letter. The font and the character attributes are mixedly used, or used together in a mix-and-match manner. The display character is marked on each key button of the key board or the keypad, representing a key value of a corresponding button.

Figure 6:
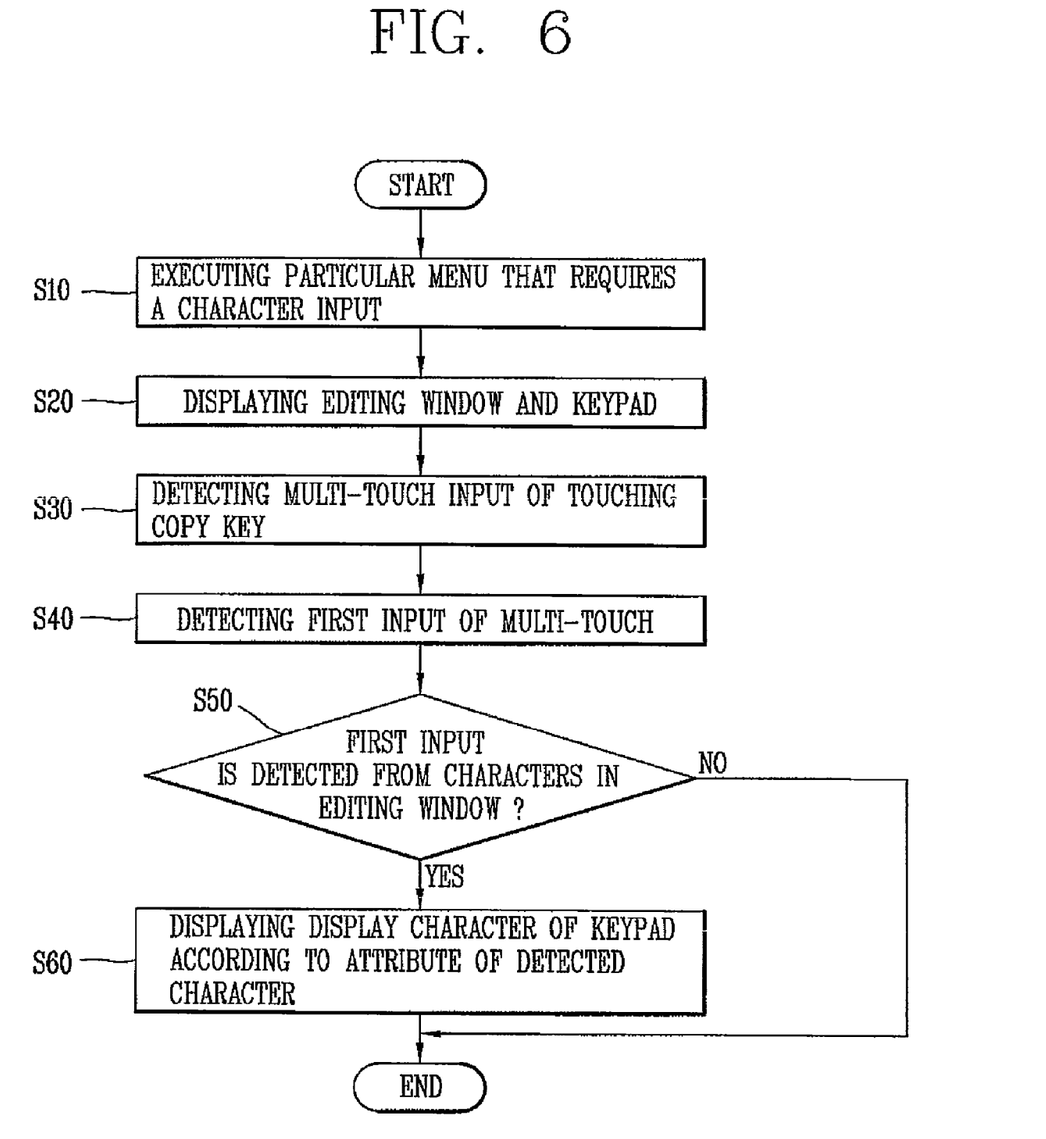
FIG. 6 is a flow chart illustrating a character input method according to a first embodiment of the present invention.
Figure 7:
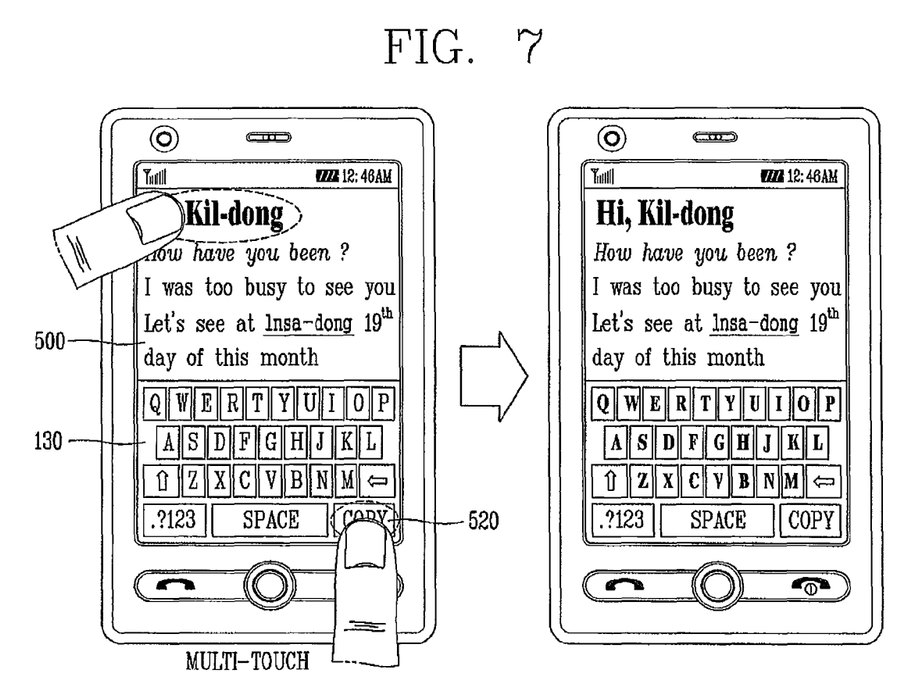
FIG. 7 shows overviews of display screens of the character input method according to the first embodiment of the present invention.

FIG. 6 is a flow chart illustrating a character input method according to a first embodiment of the present invention, and FIG. 7 shows overviews of display screens of the character input method according to the first embodiment of the present invention.

The character input method according to the first embodiment of the present invention will now be described in detail with reference to FIGS. 6 and 7.

When a particular menu requiring a character input is executed according to an external input such as an input by a user touch (e.g., user's hand or a stylus, etc.) or a button input (S10), the controller displays a certain editing window 500 and a virtual keypad 130 as shown in FIG. 7 (S20).

In this embodiment, the mobile terminal 100 may include a key button (e.g., a 'copy' key 520) for copying or storing an attribute value of the character input to (or displayed in) the editing window 500.

In this embodiment, when the font of an input character is desired to be applied to a display character of the virtual keypad 130, the user first touches one of the characters in the editing window 500 and inputs a multi-touch by additionally touching the copy key 520. When the multi-touch input by the additional touching of the copy key 520 is detected, the controller 180 checks from which displayed character in the editing window 500 the initial touch input (referred to as a 'first input', hereinafter) has been detected (S30, S40).

If the first input has been detected from one of previously input characters in the editing window 500 (S50), the controller 180 detects information about the shape, size and color, namely, the character attribute information (or font information), of the corresponding character, and reflects them on display characters 512 of the virtual keypad 130 (S50). As shown in FIG. 7, the display characters of the virtual keypad 130 are displayed according to the attributes (e.g., bold, 12 points, black) of the touched characters from the editing window 500. For example, as shown in FIG. 7, the multi-touch of one of the characters in the editing window 500 and the copy key 520 of the virtual keypad 130, applies the font information of the characters onto the keys of the virtual keypad 130.

Figure 8:
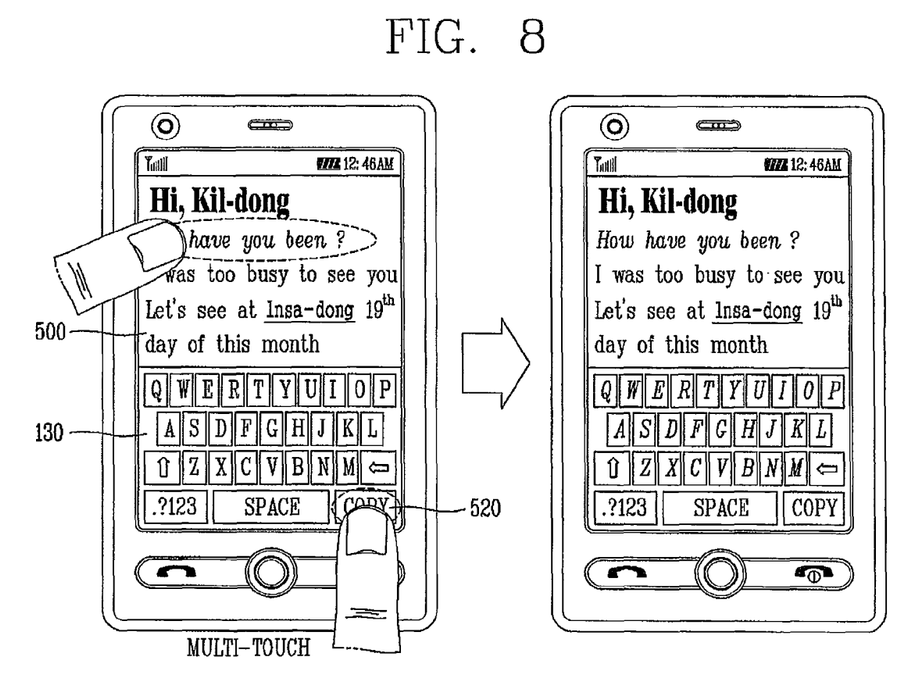
FIG. 8 to 10 are overviews of display screens of another examples of FIG. 7.
Figure 9:
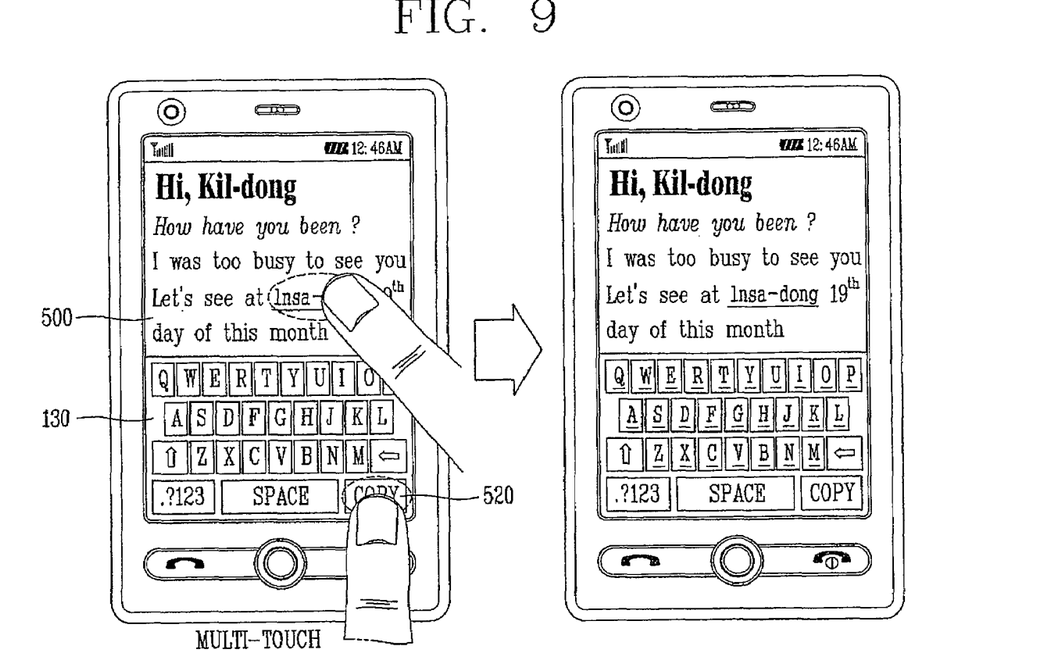
Figure 10:
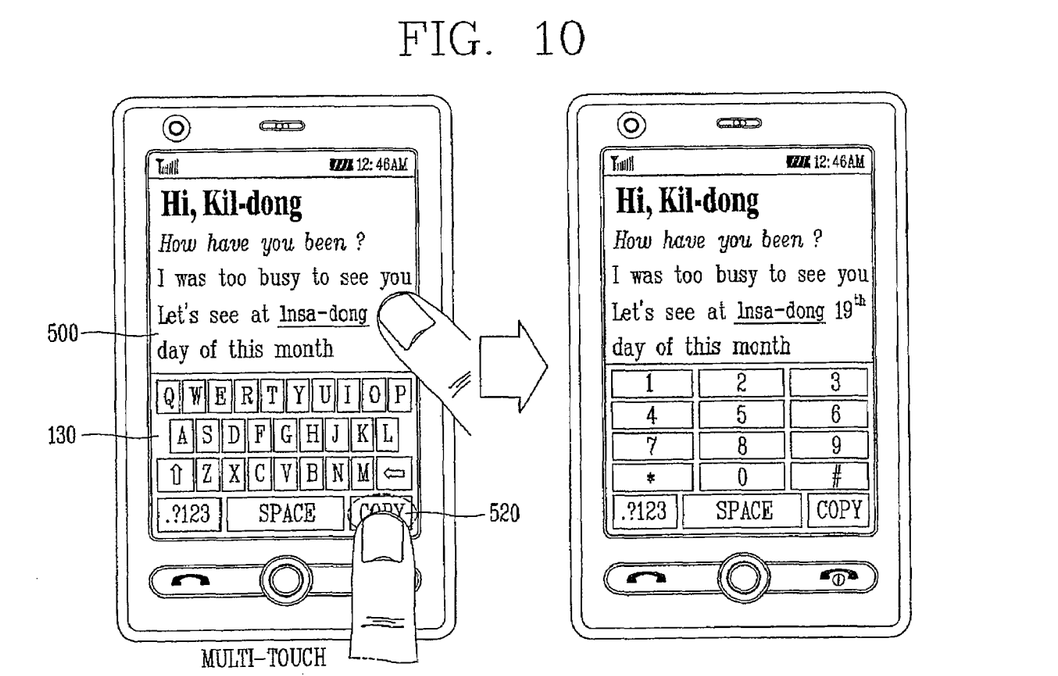

FIG. 8 to 10 are overviews of display screens of other examples of FIG. 7. Specifically, FIG. 8 shows a case where the attribute of a touched character is italic in font, 10 points in size, and blue in color, and FIG. 9 shows a case where the attribute of a touched character is Roman-under line, 8 points, and black. Again, in FIGS. 8-10, the multi-touch of one of the characters in the editing window 500 and the copy key 520 of the virtual keypad 130, applies the corresponding font information of the characters onto the keys of the virtual keypad 130.

FIG. 10 shows the number keypad 130 that is revealed when the attribute of a touched character of the first touch is a number. The number keypad may be separately displayed as shown in FIG. 10 or may be included in the virtual keypad 130 of FIGS. 7 to 9.

Figure 11:
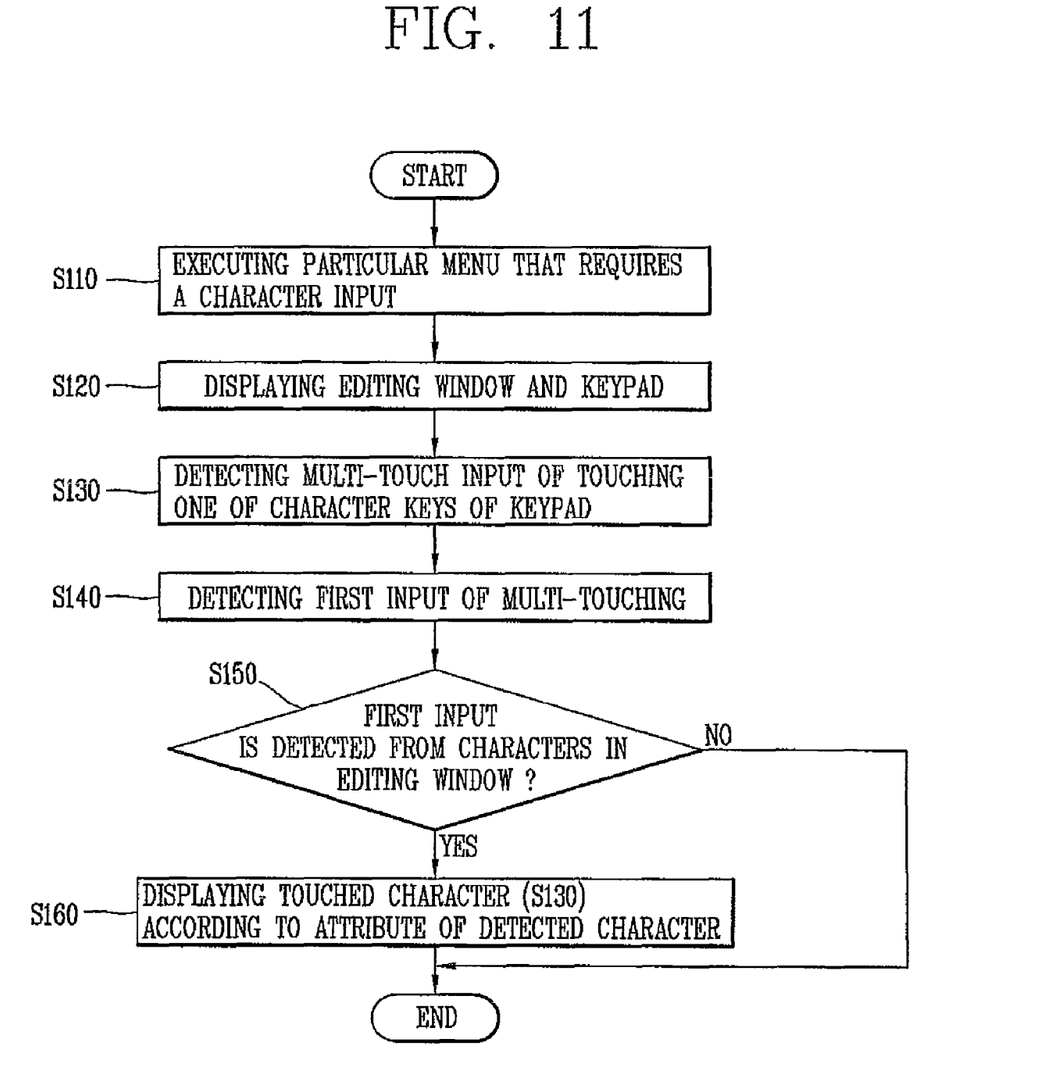
FIG. 11 is a flow chart illustrating a character input method according to a second embodiment of the present invention.
Figure 12:
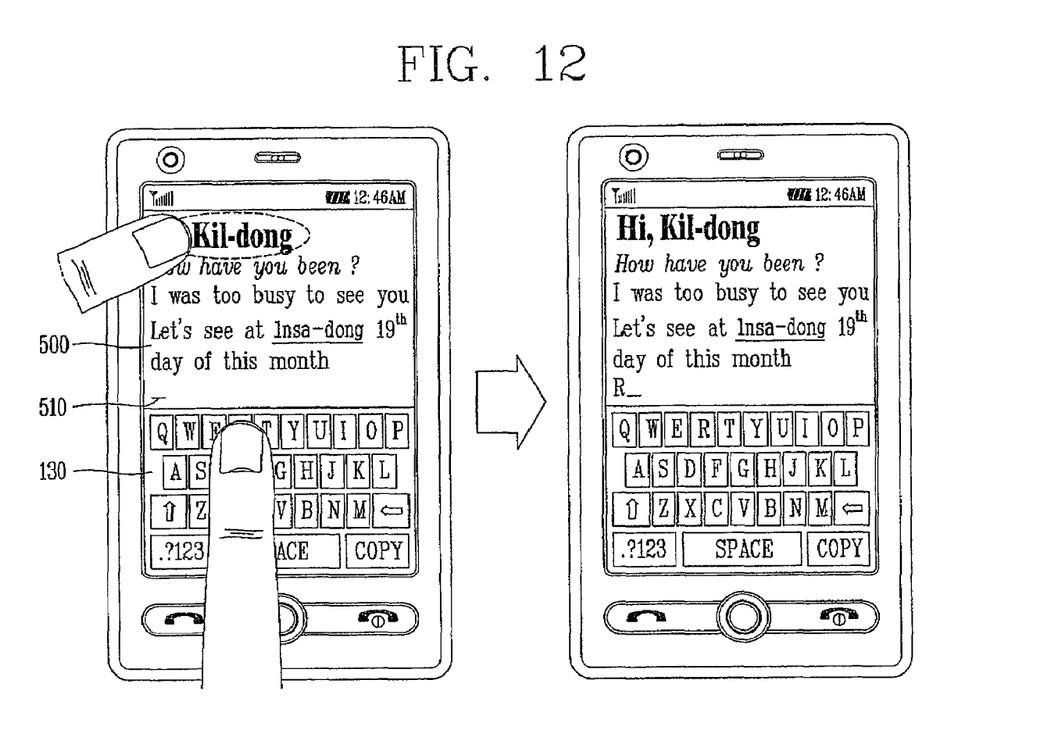
FIG. 12 shows overviews of display screens illustrating the character input method according to the second embodiment of the present invention.

Now, with reference to FIGS. 11 and 12, the character input method according to a second embodiment of the present invention is to apply a font of a character that was previously input to a character to be newly input using a multi-touch. FIG. 11 is a flow chart illustrating a character input method according to the second embodiment of the present invention, and FIG. 12 shows overviews of display screens illustrating the character input method according to the second embodiment of the present invention.

The character input method according to the second embodiment of the present invention will now be described with reference to FIGS. 11 and 12. As shown in FIG. 12, when a particular menu that requires character input is executed (S110), the controller 180 displays a certain editing window 500 and a virtual keypad 130 (S120).

In this embodiment, given that a text is displayed in the editing window 500, in order to apply the font of a previously input character to a character to be newly input, the user may touch one of character input to the editing window 500, and then touch one of the character keys of the virtual keypad 130, so that the font information, for example, of the touched character will be applied to the a newly input character, or a touched character key of the virtual keypad 130. Thus, when a multi-touch of one of the character keys (e.g., 'R') of the virtual keypad 130 is detected, the controller 180 checks the character in the editing window 500 from which the first input has been detected (S130, S140).

When the first input is determined to have been detected from one of previously input characters in the editing window 500 (S150), the controller 180 detects attribute information (e.g., italic, 10 points, and black) of the corresponding previously input character. Immediately, when the user removes the touch (hand or stylus) from the character key 'R' (the second input), the controller 180 displays the newly input character 'R' by using the detected attribute information of the previously input character. As shown in FIG. 12, the character 'R' with the attribute information (e.g., bold, 12 points, and black) is displayed at a point where a character input cursor 510 (or prompt) is positioned in the editing window 500.

The controller 180 may continue to apply the attribute information (e.g., bold, 12 points, and black) of the previously input character to characters that are subsequently input following the character 'R'. Alternately, as in the present invention, the attribute information (e.g., bold, 12 points, and black) of the previously input character may be applied only to the character 'R' so that, for additional newly input characters subsequent to the character 'R', an attribute (or a default character attribute of the editing window 500) of a prior character that was applied before the input of the character 'R' may be applied. In other words, the attribute information may be continued to be used, or the may be discontinued, after the attributed information has been applied to the first character.

In another aspect of the second embodiment of the present invention, applying an attribute information of a previously input character to a touched character key of the virtual keypad 130 may be repeated so that each key of the virtual keypad 130 becomes associated with a different attribute information. For example, for each character in the virtual keypad 130, as shown in FIG. 12, a different font, a different size, a different color and/or the like are associated with one or more character keys of the virtual keypad 130. Thus, the character 'Q' may have the attribute information of (bold, 12 points, and black), while the character 'W' may have the attribute information of (italic, 10 points, and red), and so forth. The unique association of the attribute information to the character keys of the virtual keypad 130 may be generated by the user, may be pre-stored, or may be obtained from a third party source.

Finally, although discussed in terms of a virtual keypad, embodiments of the present invention are applicable to a physical keypad.

In the embodiments of the present invention, the above-described character input method can be implemented as codes that can be read by a computer in a program-recorded medium. The computer-readable medium includes various types of recording devices in which data read by a computer system is stored. The computer-readable medium may include a ROM, a RAM, a CD-ROM, a magnetic tape, a floppy disk, an optical data storage device, and the like. The computer may include the controller 180 of the mobile terminal 100.

As described above, in the present invention, the mobile terminal is implemented such that the font of an input character is applied to a display character of the virtual keypad or to a newly input character, thereby facilitating inputting of characters (or numbers).

As the example embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A character input method of a mobile terminal, the method comprising:
    detecting a first touch input of touching a previously input character in an editing window displayed on a display screen of the mobile terminal;
    detecting attribute information of the previously input character corresponding to the first touch input;
    detecting a second touch input of touching a character key of a virtual keypad displayed on the display screen of the mobile terminal;
    applying the attribute information to a newly input character of the character key corresponding to the second touch input, if the first and second touch inputs are a multi-touch; and
    displaying the newly input character with the attribute information at a point where a character input cursor is positioned in the editing window, wherein the attribute information includes at least one of a font, a size, and a color.

2. The method of claim 1, wherein time periods of the respective first and second touch inputs overlap for the multi-touch.

3. The method of claim 1, wherein the previously input character is a number, and the newly input character includes one of 0 to 9.

4. The method of claim 1, wherein the virtual keypad includes a plurality of display characters, and each of the plurality of display characters have different attributes from each other.

5. The method of claim 1, further comprising:
    detecting a third touch input of touching a function key of the virtual keypad displayed on the display screen of the mobile terminal;
    copying at least one attribute of the previously input character to display characters on respective key buttons of the virtual keypad, if the first and third touch inputs are a multi-touch; and
    displaying the display characters with the copied at least one attribute on the respective key buttons of the virtual keypad.

6. A mobile terminal, comprising:
    a displayed screen configured to display an editing window and a virtual keypad, and to detect touch inputs; and
    a controller configured to detect a first touch input of touching a previously input character in the editing window and a second touch input of touching a character key of a virtual keypad, to detect attributed information of the previously input character corresponding to the first touch input, to apply the attribute information to a newly input character of the character key corresponding to the second touch input, if the first and second touch inputs are a multi-touch; and to control displaying the newly input character with the attribute information at a point where a character input cursor is positioned in the editing window, wherein the attribute information includes at least one of a font, a size, and a color.

7. The mobile terminal of claim 6, wherein time periods of the respective first and second touch inputs overlap for the multi-touch.

8. The mobile terminal of claim 6, wherein the previously input character is a number, and the newly input character includes one of 0 to 9.

9. The mobile terminal of claim 6, wherein the virtual keypad includes a plurality of display characters, and each of the plurality of display characters have different attributes from each other.

10. The mobile terminal of claim 6, wherein the controller is further configured to detect a third touch input of touching a function key of the virtual keypad displayed on the display screen of the mobile terminal, to copy at least one attribute of the previously input character to display characters on respective key buttons of the virtual keypad, if the first and third touch inputs are a multi-touch, and to control displaying the display characters with the copied at least one attribute on the respective key buttons of the virtual keypad.

* * * * *